(12) United States Patent
Patil (10) Patent No.: US 9,787,832 B2
(45) Date of Patent: Oct. 10, 2017

(54) SYSTEM AND METHOD FOR MANAGING AN UNSUCCESSFUL COMMUNICATION SESSION BETWEEN A SOURCE USER AND A TARGET USER

(71) Applicant: Wipro Limited, Bangalore (IN)

(72) Inventor: Pallavi Patil, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 0 days.

(21) Appl. No.: 15/082,367

(22) Filed: Mar. 28, 2016

(65) Prior Publication Data
US 2017/0237855 A1 Aug. 17, 2017

(30) Foreign Application Priority Data
Feb. 12, 2016 (IN) .............. 201641005093

(51) Int. Cl.
*H04M 3/42* (2006.01)
*H04M 3/46* (2006.01)
*H04L 29/08* (2006.01)
*H04W 4/02* (2009.01)
*G06F 17/30* (2006.01)
*G06N 99/00* (2010.01)

(52) U.S. Cl.
CPC .......... *H04M 3/46* (2013.01); *G06F 17/3053* (2013.01); *G06N 99/005* (2013.01); *H04L 67/141* (2013.01); *H04L 67/18* (2013.01); *H04L 67/22* (2013.01); *H04L 67/306* (2013.01); *H04W 4/021* (2013.01)

(58) Field of Classification Search
CPC ....... H04L 29/08108; H04L 29/08072; H04W 8/245; H04W 24/00; G06Q 30/0277

USPC ................ 455/414.1, 452.2, 418; 705/14.73; 709/203
See application file for complete search history.

(56) References Cited

U.S. PATENT DOCUMENTS 7,085,805 B1 * 8/2006 Ruberg ................ G06F 9/5055
709/203
9,535,973 B2 * 1/2017 Tee ....................... H04L 41/065
(Continued)

FOREIGN PATENT DOCUMENTS

| CN | 104243275 A | 12/2014 |
|---|---|---|
| WO | WO 2013/157015 A2 | 10/2013 |
| WO | WO 2014/201840 A1 | 12/2014 |

*Primary Examiner* — Danh Le
(74) *Attorney, Agent, or Firm* — Finnegan, Henderson, Farabow, Garrett & Dunner, LLP (57) ABSTRACT

This disclosure relates to system and method for managing an unsuccessful communication session between a source user and a target user. In one embodiment, the method comprises determining a plurality of correlative contacts between the source user and the target user from one or more communication platforms, and scoring the plurality of correlative contacts based on one or more proximity parameters among the source user, each of the plurality of correlative contacts, and the target user. The method further comprises generating an initial set of correlative contacts based on the scoring, presenting the initial set of correlative contacts along with a plurality of selectable communication recourses, initiating a communication with at least one of the initial set of correlative contacts upon selection of a corresponding communication recourse, and providing a plurality of selectable recourses to reach out to the target user based on the communication.

18 Claims, 3 Drawing Sheets

(56) References Cited

U.S. PATENT DOCUMENTS

| | | | |
|---|---|---|---|
| 2012/0076129 A1* | 3/2012 | Free | H04L 41/5054 370/352 |
| 2013/0124323 A1* | 5/2013 | Meyer | G06Q 30/0259 705/14.58 |
| 2013/0223606 A1* | 8/2013 | Lee | H04M 3/46 379/207.08 |
| 2013/0252725 A1* | 9/2013 | Buhr | A63F 13/10 463/29 |
| 2014/0114774 A1* | 4/2014 | Schultz | G06Q 10/10 705/14.73 |

* cited by examiner

SYSTEM AND METHOD FOR MANAGING AN UNSUCCESSFUL COMMUNICATION SESSION BETWEEN A SOURCE USER AND A TARGET USER

TECHNICAL FIELD

This disclosure relates generally to telecommunication, and more particularly to system and method for managing an unsuccessful communication session between a source user and a target user.

BACKGROUND

Mobile digital devices such as wireless devices, including, for example, cellular telephones, smart phones, laptop computers, notebook computers, tablet devices have become ubiquitous in recent years. With evolving lifestyles, improved technologies, and ever changing socio-economic behavior, people are increasingly using these digital devices, from where ever they are, to communicate with one another over voice, message, and email. Initiating a voice call using a mobile device or any other telephonic system is one of the most efficient means of reaching out to a desired person. Thus, when a user of a mobile device wishes to communicate with someone, he can access his contact list and attempt to connect over a voice call with the selected contact.

However, the problem arises when the desired contact is unreachable by all means of such telecommunications. For example, the desired contact may be unreachable due to a lack of communication network, or because receiving device of the desired contact is switched off, or because the desired contact is otherwise not receiving the call. Current techniques are limited in such situations as the calling user has to explore other slow and non-efficient means of reaching out to the desired contact, thereby resulting in anxiety on the part of the calling user or unnecessary delay in communicating with the desired contact. Such problem accentuates in case of emergency or urgency.

SUMMARY

In one embodiment, a method for managing an unsuccessful communication session initiated by a source user to a target user is disclosed. In one example, the method comprises determining a plurality of correlative contacts between the source user and the target user from one or more communication platforms connecting the source user and the target user. The method further comprises scoring the plurality of correlative contacts based on one or more proximity parameters among the source user, each of the plurality of correlative contacts, and the target user. The method further comprises generating an initial set of correlative contacts from the plurality of correlative contacts based on the scoring. The method further comprises presenting the initial set of correlative contacts along with a plurality of selectable communication recourses for each of the initial set of correlative contacts. The method further comprises initiating a communication with at least one of the initial set of correlative contacts upon selection of a corresponding communication recourse from the plurality of selectable communication recourses. The method further comprises providing a plurality of selectable recourses to reach out to the target user based on the communication with the at least one of the initial set of correlative contacts.

In one embodiment, a system for managing an unsuccessful communication session initiated by a source user to a target user is disclosed. In one example, the system comprises at least one processor and a memory communicatively coupled to the at least one processor. The memory stores processor-executable instructions, which, on execution, cause the processor to determine a plurality of correlative contacts between the source user and the target user from one or more communication platforms connecting the source user and the target user. The processor-executable instructions, on execution, further cause the processor to score the plurality of correlative contacts based on one or more proximity parameters among the source user, each of the plurality of correlative contacts, and the target user. The processor-executable instructions, on execution, further cause the processor to generate an initial set of correlative contacts from the plurality of correlative contacts based on the scoring. The processor-executable instructions, on execution, further cause the processor to present the initial set of correlative contacts along with a plurality of selectable communication recourses for each of the initial set of correlative contacts. The processor-executable instructions, on execution, further cause the processor to initiate a communication with at least one of the initial set of correlative contacts upon selection of a corresponding communication recourse from the plurality of selectable communication recourses. The processor-executable instructions, on execution, further cause the processor to provide a plurality of selectable recourses to reach out to the target user based on the communication with the at least one of the initial set of correlative contacts.

In one embodiment, a non-transitory computer-readable medium storing computer-executable instructions for managing an unsuccessful communication session initiated by a source user to a target user is disclosed. In one example, the stored instructions, when executed by a processor, cause the processor to perform operations comprising determining a plurality of correlative contacts between the source user and the target user from one or more communication platforms connecting the source user and the target user. The operations further comprise scoring the plurality of correlative contacts based on one or more proximity parameters among the source user, each of the plurality of correlative contacts, and the target user. The operations further comprise generating an initial set of correlative contacts from the plurality of correlative contacts based on the scoring. The operations further comprise presenting the initial set of correlative contacts along with a plurality of selectable communication recourses for each of the initial set of correlative contacts. The operations further comprise initiating a communication with at least one of the initial set of correlative contacts upon selection of a corresponding communication recourse from the plurality of selectable communication recourses. The operations further comprise providing a plurality of selectable recourses to reach out to the target user based on the communication with the at least one of the initial set of correlative contacts.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
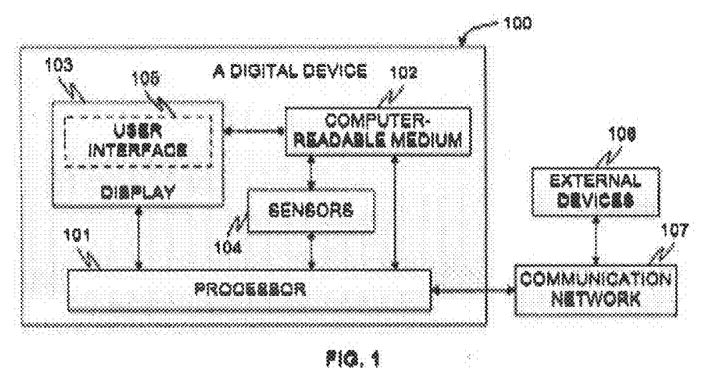
FIG. 1 is a block diagram of an exemplary system for managing an unsuccessful communication session between a source user and a target user in accordance with some embodiments of the present disclosure.

Referring now to FIG. 1, an exemplary system 100 for managing an unsuccessful communication session between a source user and a target user is illustrated in accordance with some embodiments of the present disclosure. In particular, the system 100 includes a digital device that implements an unsuccessful communication session management engine for dynamically managing an unsuccessful communication session when a target device or the target user is unreachable. As will be appreciated by those skilled in the art, the unsuccessful communication session may be due to the target device being out of communication network, the target device being switched off, the target user not receiving the call, and other such reasons. The unsuccessful communication session management engine determines a plurality of correlative contacts between the source user and the target user, scores the plurality of correlative contacts based on one or more proximity parameters, generates an initial set of correlative contacts based on the scoring, initiates a communication with at least one of the initial set of correlative contacts, and provides a plurality of selectable recourses to reach out to the target user based on the communication. The system 100 comprises one or more processors 101, a computer-readable medium (e.g., a memory) 102, a display 103, and one or more sensors (e.g., a GPS sensor, an altimeter, etc.) 104. The computer-readable storage medium 102 stores instructions that, when executed by the one or more processors 101, cause the one or more processors 101 to manage the unsuccessful communication session in accordance with aspects of the present disclosure. The computer-readable storage medium 102 may also store multiple sensor parameters captured by the sensors 104 and other data as required by the system 100. The system 100 interacts with a user via a user interface 105 accessible via the display 103. The system 100 may also interact with one or more external devices 106 over a communication network 107 for sending or receiving voice or other data. The external devices 106 may include, but are not limited to, a remote server, and another digital device.

Figure 2:
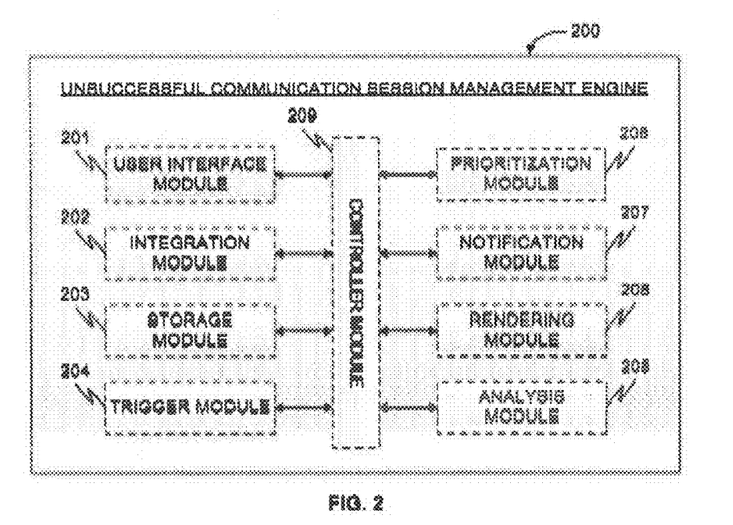
FIG. 2 is a functional block diagram of an unsuccessful communication session management engine in accordance with some embodiments of the present disclosure.

Referring now to FIG. 2, a functional block diagram of the unsuccessful communication session management engine 200 implemented by the system 100 of FIG. 1 is illustrated in accordance with some embodiments of the present disclosure. The unsuccessful communication session management engine 200 may be in form of an installable application that may be installed on the digital device via a user. The engine 200 enables the user to communicate with or to reach out to the unreachable target user by dynamically suggesting various recourses. In some embodiments, the engine 200 comprises a user interface module 201, an integration module 202, a storage module 203, a trigger module 204, an analysis module 205, a prioritization module 206, a notification module 207, a rendering module 208, and a controller module 209.

The user interface module 201 enables the user to interact with the engine 200 via a graphical user interface displayed on the digital device. For example, upon installation of the engine 200 on the digital device, the user interface module 201 may prompt the user to provide access to all communication platforms on which the user has account or on which the user is active. Examples of communication platforms include, but are not limited to, social networking platform (e.g., Facebook, Google+, LinkedIn, Twitter, etc.), an instant messaging platform (e.g., WhatsApp, Viber, Hike, etc.), an email platform (e.g., Gmail, Yahoo, Official Email Account, etc.), a communication device platform (e.g., mobile phone directory, Siri of iOS, etc.), a collaboration platform (e.g., Microsoft SharePoint, Box, etc.), a media sharing platform (e.g., Instagram, Pinterest, etc.), and a blogging platform (e.g., WordPress, Tumblr, etc.). The user may login to each of the communication platforms for providing the access to the engine 200. Further, the user interface module 201 may present selectable input, receive user selection or other input, present suggestions, present output, and so forth. In some embodiments, the user interface module 201 may interact with the user by providing notification messages.

The integration module 202 enables the engine 200 to extract and process information (e.g., profiles of the user and various contacts of the user, communication history or other interactions between the user and various contacts of the user, etc.) from the various communication platforms applicable to the user. For example, in some embodiments, the integration module 202 enables the engine 200 to acquire information from the various communication platforms once during the installation process and then at periodic intervals. Further, the integration module 202 enables the engine 200 to access various modules and subsystem of the digital devices such as contact directory of the digital device, sensors (e.g., GPS) of the digital device, communication interface of the digital device, and so forth. Thus, the engine 200 has access to profiles of all the contacts of the user from the various communication platforms along with communication and interaction among such contacts. The integration module 202 compiles and indexes all the information so gathered and stores the same in a database via the storage module 203. For example, if the user has 200 friends on Facebook, 150 professional connections on LinkedIn, 250 contacts in the directory of the digital device, 130 friends on Twitter, 120 contacts on Yahoo Mail, 350 contacts on Gmail, 80 friends on Google+, 90 contacts on office mail application, then the integration module 202 extracts, compiles, and indexes the profiles of all unique contacts from all the above listed communication platforms and stores the same in a database via the storage module 203. In some embodiments, the information gathered from the various communication platforms is stored in a single database.

The storage module 203 stores the information extracted from all the communication platforms and the digital device in the database. It stores the user profile as well as profiles of various contacts from the various communication platforms. The profile may include a name, a username, a contact number, a contact address, a contact email, a location, demographic information, a relationship, an interest, and so forth. In some embodiments, the storage module 203 segregates the extracted contacts according to the respective communication platforms. For example, contacts from Facebook are stored separately from that of LinkedIn or Twitter, and so forth. This enables fast retrieval and searching of the stored information. Alternatively, in some embodiments, the storage module 203 stores all the contacts from all the communication platforms in a single database. The storage module 203 also stores a location history of the user, a prior communication history or interaction between the user and the various contacts, a presence in an event (e.g., concert, movie, dining, etc.), and so forth. Further, the storage module 203 stores the proximity parameters and other data extracted by the engine 200 with respect to the user (i.e., the source user), a desired or target user, and various correlative contacts as will be explained in greater detail below.

The trigger module 204 implements a timer or a counter that keeps a track on the time elapsed since the initiation of the call from the user to the target user, a number of rings initiated during the call, or a number of continuous unsuccessful attempts made by the user to contact the target user. For example, once the user calls the target user, the engine 200 triggers the trigger module 204 at the backend to initiate a count of predefined interval (e.g., 30 seconds, or 45 seconds), to initiate a count of predefined number of rings (e.g., 9 rings, or 12 rings), or to initiate a count of predefined number of attempts (e.g., 3 attempts in a span of 30 minutes). If the user is not successful in establishing a communication with the target user within the predefined interval, the predefined number of rings, or the predefined number of attempts, then the trigger module 204 triggers the analysis module 205 for managing such unsuccessful communication session. For example, the trigger module 204 may trigger the analysis module 205 when the target user is not reachable over the network after multiple attempts. Additionally, the trigger module 204 may be customized differently for different target users based on a relationship between the user and the target user. For example, the trigger module 204 may trigger the analysis module 205 at the completion of 12 rings for a minor child related to the user but may trigger the analysis module 205 at the completion of 5 attempts in a span of 60 minutes for a colleague of the user.

The analysis module 205 in conjunction with the trigger module 204 detects failure to establish the communication session with the target user. In particular, the analysis module 205 detects failure to establish the communication session with a digital device in possession of the target user. Upon detecting the failure to establish the communication session with the target user, the analysis module 205 determines the profile and other information with respect to the target user from the database maintained by the storage module 203. For example, the analysis module 205 determines the contact details (e.g., phone number, address, email id etc.) and location of the target user. Additionally, the analysis module 205 identifies one or more communication platforms through which the target user is connected to the source user (i.e., the user initiating the communication). Upon identification of the communication platforms connecting the source user and the target user, the analysis module 205 determines a plurality of correlative contacts between the source user and the target user from the identified communication platforms. The correlative contacts are determined by accessing and correlating the profiles of the source user, the target user, and a plurality of contacts of the source user or the target user from each of the communication platforms. For example, the analysis module 205 identifies that the target user is a colleague of the source user based on the LinkedIn profiles of the source user and the target user. The analysis module 205 also identifies that the target user is not a part of source user's Facebook or Twitter contacts. The analysis module 205 will therefore determine that the details of the target user can only be fetched through common contacts in source user's office network and determines such common contacts as correlative contacts. The identification of such common contacts is by accessing office related communication platforms (e.g., professional email platform, professional instant message platform, professional contacts, official calendar, etc.) of the source user as well as the target user.

Further, the analysis module 205 extracts and analyzes one or more proximity parameters with respect to the source user, each of the plurality of correlative contacts, and the target user. The proximity parameters may be extracted from the communication platforms, from the database maintained by the storage module 203, or from the digital devices of the correlative contacts and the target user provided that the engine 200 is likewise installed on such devices. The proximity parameters may include, but are not limited to, a time zone, a relationship status, a communication history, a communication type, a tracking history, a location history, and a presence in an event. For example, the location of the source user, the target user, and the correlative contact will enable the determination of their respective time zones. Alternatively, an out of office message of the target user present in user mail box may enable determination of the location and/or time zone. Further, for example, the time zone of the source user, each of the plurality of correlative contacts, and the target user may be analyzed to determine if one of the correlative contacts is in same time zone or a closer time zone as that of target user. Similarly, the location history of the source user, each of the plurality of correlative contacts, and the target user may be analyzed to determine if one of the correlative contacts is in same location or a close by location as that of target user. Similarly, the presence of the target user and each of the plurality of correlative contacts in any event may be analyzed to determine if one of the correlative contacts attended same event as that of target user. Further, a prior history of tracking the target user with the help of one or more of the correlative contacts may be fetched from the database. Additionally, a relationship between the source user or the target user and each of the plurality of correlative contacts may be analyzed to determine if one of the correlative contacts is in close relation with both the source user and the target user. In some embodiments, a rectification on relationship status between the source user or the target user and each of the plurality of correlative contacts may also be analyzed. It should be noted that the relationship or the rectification on relationship status may be determined from social network account and a degree of interactions between the users on various communication platforms. Further, a communication history and a communication type (e.g., phone, email, message, etc.) between the source user or the target user and each of the plurality of correlative contacts may be analyzed to determine if one of the correlative contacts is preferred over the others to reach out to the target user. It should be noted each of the proximity parameters may be analyzed independent of the other. In other words, the analysis of parameters need not be sequential or dependent on previously analyzed parameter. However, in some embodiments, the analysis may be sequential and dependent on previously analyzed parameter.

Further, the analysis module 205 scores the plurality of correlative contacts based on the one or more proximity parameters among the source user, each of the plurality of correlative contacts, and the target user. In some embodiments, the analysis module 205 generates score by assigning a primary weight to each of the one or more proximity parameters using a machine learning algorithm, and by computing a weighted average of the one or more proximity parameters for each of the plurality of correlative contacts. In some embodiments, the analysis module 205 may further generate a more refined score by assigning a secondary weight to each of the one or more proximity parameters using a machine learning algorithm, and by computing a weighted average of the one or more proximity parameters for each of the plurality of correlative contacts. It should be noted that the primary weights are determined and adjusted over time based on user's choice of correlative contacts to reach out to given target users, success or failure in reaching out to target users, and so forth in previous deployment of the engine 200. In other words, the relative importance of different proximity parameters is continuously adjusted and optimized over time to provide most relevant correlative contacts. Further, it should be noted that the secondary weights are determined on the fly based on data extracted from the communication with an initial set of correlative contacts.

Additionally, the analysis module 205 identifies various communication recourses available for communicating with the correlative contacts. For example, the various communication recourses may include, but are not limited to, phone call, a text message, an instant message, an email, a voice mail, a video call, and a post. In some embodiments, the analysis module 205 also determines preferred communication recourse from the various communication recourses for each of the initial set of correlative contacts. The determination of the preferred communication recourse is based on a preference, a location, or a time zone of the correlative contact. Further, the determination of the preferred communication recourse is based on a relationship status or a communication history between the source user and the correlative contact. Moreover, as will be explained in greater detail below, the analysis module 205 may perform other data processing functions such as extracting data from communication with the correlative contacts, determining selectable recourses to reach out to the unreachable target user based on the extracted data, determining a need to generate a subsequent set of correlative contacts based on the extracted data or a satisfaction level of the user, and so forth.

The prioritization module 206 generates an initial set of correlative contacts from the plurality of correlative contacts based on the score. In some embodiment, the prioritization module 206 applies a predetermined primary scoring threshold so as to generate the initial list. Alternatively, in some embodiments, the prioritization module 206 ranks the correlative contacts based on the score and generates the initial set of correlative contacts based on the outcome of the ranking. Further, the prioritization module 206 in conjunction with the user interface module 201 and the notification module 207 presents the initial set of correlative contacts to the user. Additionally, the prioritization module 206 presents various selectable communication recourses (e.g., phone, email, message, post, etc.) for each of the initial set of correlative contacts using which communication may be initiated by the source user to reach out to the correlative contacts. In some embodiments, the prioritization module 206 also suggests or indicates preferred communication recourse from the various communication recourses for each of the initial set of correlative contacts. As discussed above, the various communication recourses or the preferred communication recourse are identified by the analysis module 205. In some embodiments, the prioritization module 206 also presents a mini-profile for each of the initial set of correlative contacts. The mini-profile may include a name, a location, a time-zone, a score, and so forth.

The notification module 207 generates various notifications to the user right from the time of installation of the engine 200. The notification module 207 functions in conjunction with user interface module 201 to request the user access to various communication platforms, to display the initial or subsequent list of correlative contacts along with selectable communication recourses, to suggest the preferred communication recourse to communicate with a given correlative contact, to inform of any communication received from the correlative contact, to display recourses to reach out to the unreachable target user, to inform of a date and time to reinitiate communication with the target user (e.g., after a pre-defined period, at a pre-defined date and time), and so forth. In some embodiments, the notification module 207 provides notifications to the user if some other user is trying to reach him along with a time stamp of such attempt. Further, in some embodiments, the notification module 207 provides a list of correlative contacts that the other user approached to reach the user along with corresponding means of communication. In such embodiments, the engine 200 on the user's device is communication with engine 200 of the other user's device.

The rendering module 208 initiates a communication with one or more of the initial set of correlative contacts via one or more selected communication recourses. Thus, once a communication recourse is selected by the user for a given correlative contact, the rendering module 208 initiates communication with the given correlative contact via the selected communication recourse. For example, from the initial list, the user may manually select to call one correlative contact (e.g., B) while mail or text another correlative contact (e.g., A). The rendering module 208 initiates call to B and send mail or text message or instant message to A in parallel. The rendering module 208 integrates with the various communication platforms present on the user's digital device of which the user has provided access to so as to initiate the communication. Further, the rendering module 208 in conjunction with the analysis module 205 provides selectable recourses to reach out to the target user based on the communication with the one or more of the initial set of correlative contacts. The rendering module 208 in conjunction with the analysis module 205 extracts and accumulates data from communication with the one or more correlative contacts, and determines the selectable recourses to reach out to the target user based on the data. For example, if one of the correlative contact informs the user over a phone call that the target user is travelling to a remote location with limited access to communication network and will be back in about 5 days, the rendering module 208 in conjunction with the analysis module 205 extracts such information and provides following selectable recourses to the user: set a reminder for calling the target user after 5 days (using the trigger module 204 in conjunction with the notification module 207), send an email to the target user requesting call back (using email application on the digital device), send a message to the target user requesting call back (using messaging application on the digital device), terminating the engine 200, and so forth. Further, for example, if one of the correlative contact informs the user that he has limited information with respect to the target user but he is aware that the target user is with some other contact known to user, the rendering module 208 in conjunction with the analysis module 205 extracts such information and provides following selectable recourses to the user: call the other contact, email the other contact, message the other contact, leave a post to the other contact, or terminating the engine 200. The rendering module 208 or the analysis module 205 may employ suitable data processing algorithms to process the communication with the correlative contact. The data processing algorithms may include, but are not limited to, text processing algorithms, speech processing algorithms (e.g., speech recognition algorithms), and natural language processing algorithms. Thus, for example, a voice communication may be converted into text using speech recognition and the concise description or the relevant keywords may then be extracted using text processing algorithms.

In some embodiments, the rendering module 208 in conjunction with the analysis module 205 determines a need to generate a subsequent set of correlative contacts from the plurality of correlative contacts based on the extracted data or a satisfaction level of the source user. For example, if one or more of the correlative contact informs the user that they have no definite information about the target user except that the target user was probably travelling to certain location, the rendering module 208 in conjunction with the analysis module 205 extracts such information and provide an option to the user to generate a subsequent set of correlative contacts based on the extracted data. Alternatively, the option to generate the subsequent set of correlative contacts based on the extracted data may be exercised by the user based on his satisfaction level with the communication with the initial set of correlative contacts. In response to the need, the analysis module 205 in conjunction with the prioritization module 206 generates the subsequent set of correlative contacts. As discussed above, the analysis module 205 generates a more refined score by assigning a secondary weight to each of the one or more proximity parameters, and by computing a weighted average of the one or more proximity parameters for each of the plurality of correlative contacts. The secondary weights are determined based on extracted data. The prioritization module 206 generates the subsequent set of correlative contacts from the plurality of correlative contacts based on the score. In some embodiment, the prioritization module 206 applies a predetermined secondary scoring threshold so as to generate the subsequent list. It should be noted that, in some embodiments, the subsequent set of correlative contacts is generated from the initial set of correlative contacts.

Further, the prioritization module 206 in conjunction with the user interface module 201 and the notification module 207 presents the subsequent set of correlative contacts along with a plurality of selectable communication recourses for each of the subsequent set of correlative contacts to the user. In some embodiments, the prioritization module 206 also suggests or indicates preferred communication recourse from the various communication recourses for each of the subsequent set of correlative contacts. The rendering module 208 then initiates a communication with one or more of the subsequent set of correlative contacts via one or more selected communication recourses. Further, the rendering module 208 in conjunction with the analysis module 205 provides selectable recourses to reach out to the target user based on the communication with the one or more of the subsequent set of correlative contacts.

The controller module 209 controls and communicates with each of the above mentioned modules 201-208. The controller module 209 is responsible to terminate or re-initiate the engine 200 for communicating with the target user or one of the correlative contacts. For example, the controller module 209 terminates enabling communication with the target user once the user manually opts to terminate the engine 200 based on the data obtained from the rendering module 208. Alternatively, the controller module 209 activates the analysis module 205 and the prioritization module 206 to re-generate the subsequent set of correlative contacts to continue the process, until the user reaches out to the target user, is satisfied, or terminates the engine 200.

By way of an example, the user may download and install an application corresponding to the engine 200 on his digital device (e.g., user's mobile phone) from a service provider's server (e.g., app stores of iOS, play store of android, etc.). Alternatively, the application may be hardcoded in the device itself by the device manufacturer or hardcoded in the subscriber identification module (SIM) of the service provider. Once installed, the user is prompted to identify all the communication platforms on which the user is active. The user may login to each of such communication platforms to provide the engine 200 one time access to such communication platforms. The engine 200 then stores the contacts of the user from each of such platforms. The engine 200 also synchronizes with the phone directory and GPS installed in the digital device. Thus, at the backend, the engine 200 has all the contacts, their profiles and other information in a single database. The database can now be retrieved as and when required by the engine 200. In some embodiments, the user may also be provided with an option to invite his contacts to download the engine 200. The contacts may install and setup the engine 200 on their respective digital devices in similar fashion. In such embodiments, the networked engines 200 may act as one of the communication platforms so as to directly communicate with one another to exchange profile, location, and other information with each other. After the setup, the engine 200 operationalizes if the target user is unreachable when the user is trying to reach him i.e. the communication session with the target user is unsuccessful.

In operation, the engine 200 first identifies failure to connect to the target user in possession of the second digital device by the source user of the first digital device. The engine 200 then identifies the target user's profile (e.g., name, phone number, address, location, email id etc.) from the database. The engine 200 further queries its database to identify the communication platforms of which the target user is a part of. The engine 200 then analyzes such communication platforms and determines one or more correlative contacts between the target user and the source user. Further, the engine 200 analyses each of one or more proximity parameters among the source user, the target user, and each of the one or more correlative contacts to generate a score. The engine 200 then ranks the one or more correlative contacts based on the score to generate an initial set of correlative contact based on the outcome of the ranking. The engine 200 displays the initial set of correlative contact to the user along with their mini profiles and one or more means of communication that can be initiated by the user to reach them. Further the engine 200 notifies the user at least one best means of such communications with each of the initial set of correlative contacts.

Upon selection of the means of communication corresponding to one or more of the initial set of correlative contacts, the engine 200 initiates communication to reach the identified one or more correlative contacts via the selected means of communication. The engine 200 then extracts and accumulates the data obtained from the various communications. The engine 200 further analyzes the data to provide various recourses to reach out to the target user. The engine 200 then enables to communicate with the target user via a selected recourse if the user is satisfied with provided recourses and thereon terminates. Alternatively, if the user is not satisfied with provided recourses or if the engine 200 determines a need to provide a more refined set of correlative contacts, the engine 200 re-scores or re-generates a subsequent more refined set of correlative contacts and the engine 200 repeats the process so as to provide various recourses to reach out to the target user.

As will be appreciated by one skilled in the art, a variety of processes may be employed for managing an unsuccessful communication session between a source user and a target user. For example, the exemplary system 100 may manage an unsuccessful communication initiated by a source user to a target user by the processes discussed herein. In particular, as will be appreciated by those of ordinary skill in the art, control logic and/or automated routines for performing the techniques and steps described herein may be implemented by the system 100, either by hardware, software, or combinations of hardware and software. For example, suitable code may be accessed and executed by the one or more processors on the system 100 to perform some or all of the techniques described herein. Similarly application specific integrated circuits (ASICs) configured to perform some or all of the processes described herein may be included in the one or more processors on the system 100.

Figure 3:
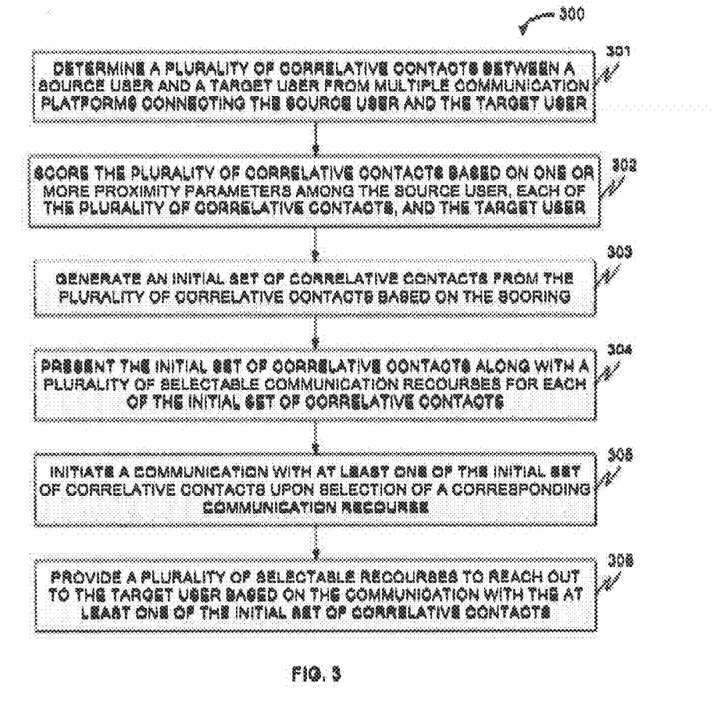
FIG. 3 is a flow diagram of an exemplary process for managing an unsuccessful communication session between a source user and a target user in accordance with some embodiments of the present disclosure.

For example, referring now to FIG. 3, exemplary control logic 300 for managing an unsuccessful communication session initiated by a source user to a target user via a system, such as system 100, is depicted via a flowchart in accordance with some embodiments of the present disclosure. As illustrated in the flowchart, the control logic 300 includes the steps of determining a plurality of correlative contacts between the source user and the target user from one or more communication platforms connecting the source user and the target user at step 301, scoring the plurality of correlative contacts based on one or more proximity parameters among the source user, each of the plurality of correlative contacts, and the target user at step 302, generating an initial set of correlative contacts from the plurality of correlative contacts based on the scoring at step 303, and presenting the initial set of correlative contacts along with a plurality of selectable communication recourses for each of the initial set of correlative contacts at step 304. The control logic 300 further includes the steps of initiating a communication with at least one of the initial set of correlative contacts upon selection of a corresponding communication recourse from the plurality of selectable communication recourses at step 305, and providing a plurality of selectable recourses to reach out to the target user based on the communication with the at least one of the initial set of correlative contacts at step 306. In some embodiments, the control logic 300 may further include the step of detecting a failure to establish a communication session with the target user.

In some embodiments, the one or more communication platforms comprise a social networking platform, an instant messaging platform, an email platform, a communication device platform, a collaboration platform, a media sharing platform, or a blogging platform. In some embodiments, the one or more proximity parameters comprises at least one of a time zone, a relationship status, a communication history, a communication type, a tracking history, a location history, and a presence in an event. In some embodiments, the plurality of selectable communication recourses comprises at least one of a phone call, a video call, a text message, an instant message, a voice mail, a post, and an email.

Further, in some embodiments, determining at step 301 comprises accessing a profile of the source user, a profile of the target user, and a plurality of profiles corresponding to a plurality of contacts of at least one of the source user and the target user from each of the one or more communication platforms, and correlating the profile of the source user, the profile of the target user, and the plurality of profiles corresponding to the plurality of contacts. In some embodiments, the profile comprises at least one of a name, a username, a contact number, a contact address, a contact email, a location, a demographic information, a relationship, and an interest. In some embodiments, the control logic 300 may further include the step of compiling and indexing the plurality of profiles corresponding to the plurality of contacts from each of the one or more communication platforms in a single database.

Further, in some embodiments, scoring at step 302 comprises assigning a primary weight to each of the one or more proximity parameters using a machine learning algorithm, and computing a weighted average of the one or more proximity parameters for each of the plurality of correlative contacts. In some embodiments, generating the initial set at step 303 comprises applying a predetermined primary scoring threshold. In some embodiments, presenting at step 304 comprises presenting a mini-profile for each of the initial set of correlative contacts, the mini-profile comprising at least one of a name, a location, a time-zone, and a score. In some embodiments, providing the plurality of selectable recourses to reach out to the target user at step 306 comprises extracting data from the communication with the at least one of the initial set of correlative contacts, and determining the plurality of selectable recourses to reach out to the target user based on the data.

Additionally, in some embodiments, the control logic 300 may further include the step of suggesting at least one preferred communication recourse from the plurality of selectable communication recourses for each of the initial set of correlative contacts. In some embodiments, suggesting the at least one preferred communication recourse is based on at least one of a preference of a corresponding correlative contact, a location of the corresponding correlative contact, a time zone of the corresponding correlative contact, a relationship status between the source user and the corresponding correlative contact, and a communication history between the source user and the corresponding correlative contact. Moreover, in some embodiments, the control logic 300 may further include the steps of determining a need to generate a subsequent set of correlative contacts from the plurality of correlative contacts based on at least one of a satisfaction level of the source user and the communication with the at least one of the initial set of correlative contacts, generating the subsequent set of correlative contacts in response to the need, presenting the subsequent set of correlative contacts along with a plurality of selectable communication recourses for each of the subsequent set of correlative contacts, and initiating a communication with at least one of the subsequent set of correlative contacts upon selection of a corresponding communication recourse from the plurality of selectable communication recourses. In some embodiments, generating the subsequent set of correlative contacts comprises assigning a secondary weight to each of the one or more proximity parameters using a machine learning algorithm, computing a weighted average of the one or more proximity parameters for each of the plurality of correlative contacts, and applying a predetermined secondary scoring threshold. In some embodiments, generating the subsequent set of correlative contacts comprises generating the subsequent set of correlative contacts from the initial set of correlative contacts.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

In some embodiments, in way of example only that the number of generating subsequent set of correlative contacts from the plurality of correlative contacts is limited to five or six.

In another embodiment, in way of example only there can be a timer to determine the number of generating subsequent set of correlative contacts from the plurality of correlative contacts.

Yet in another embodiment, when the extracting data from the communication with the at least one of the initial set of correlative contacts and determining the plurality of selectable recourses to reach out to the target user based on the data is not resourceful then based on a predefined time period the process of extracting data and determining the plurality of selectable recourses is repeated. This process could be offline or on the fly.

Figure 4:
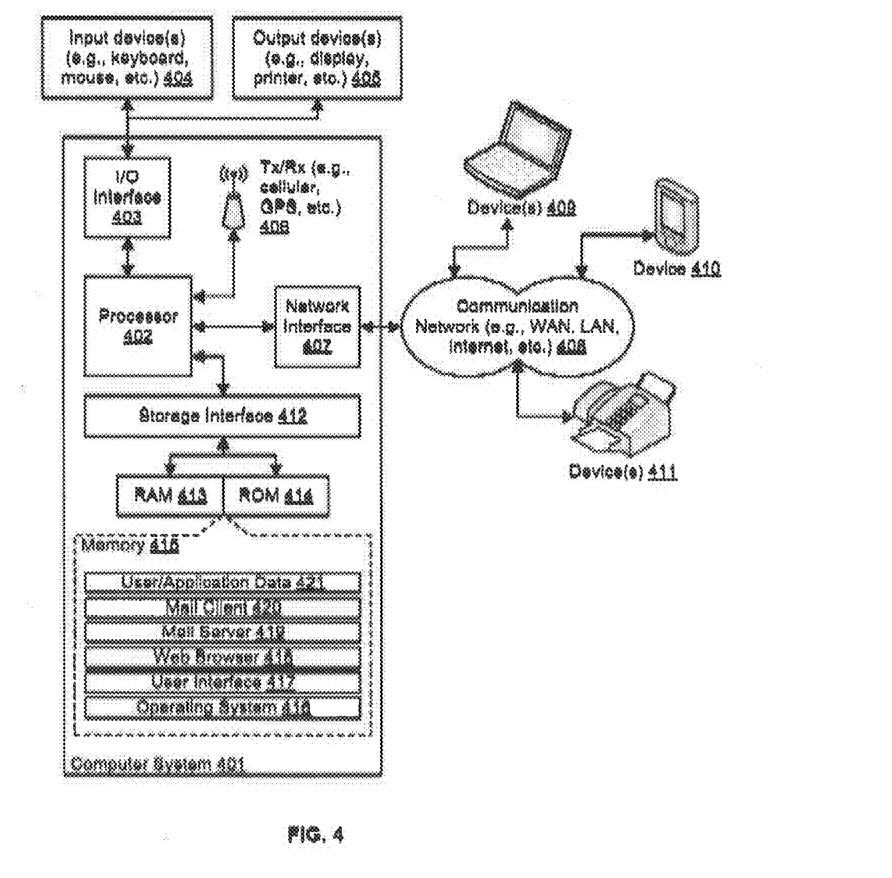
FIG. 4 is a block diagram of an exemplary computer system for implementing embodiments consistent with the present disclosure.

Referring now to FIG. 4, a block diagram of an exemplary computer system 401 for implementing embodiments consistent with the present disclosure is illustrated. Variations of computer system 401 may be used for implementing system 100 for managing an unsuccessful communication session between a source user and a target user. Computer system 401 may comprise a central processing unit ("CPU" or "processor") 402. Processor 402 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 409, 410, and 411. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. (e.g., profiles of various contacts, location details, proximity parameters, communication history, prior tracking history, notifications, preferences, primary weights, data extracted from the communication, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described system and method for managing an unsuccessful communication session between a source user and a target user. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for managing an unsuccessful communication session initiated by a source user to a target user, the method comprising:

determining, via a processor, a plurality of correlative contacts between the source user and the target user from one or more communication platforms connecting the source user and the target user;

scoring, via the processor, the plurality of correlative contacts based on one or more proximity parameters among the source user, each of the plurality of correlative contacts, and the target user, wherein the scoring comprises:
  assigning, via the processor, a primary weight to each of the one or more proximity parameters using a machine learning algorithm, and
  computing, via the processor, a weighted average of the one or more proximity parameters for each of the plurality of correlative contacts;
generating, via the processor, an initial set of correlative contacts from the plurality of correlative contacts based on the scoring;
presenting, via the processor, the initial set of correlative contacts along with a plurality of selectable communication recourses for each of the initial set of correlative contacts;
initiating, via the processor, a communication with at least one of the initial set of correlative contacts upon selection of a corresponding communication recourse from the plurality of selectable communication recourses; and
providing, via the processor, a plurality of selectable recourses to reach out to the target user based on the communication with the at least one of the initial set of correlative contacts.

2. The method of claim 1, further comprising detecting a failure to establish a communication session with the target user.

3. The method of claim 1, wherein the one or more communication platforms comprise a social networking platform, an instant messaging platform, an email platform, a communication device platform, a collaboration platform, a media sharing platform, or a blogging platform.

4. The method of claim 1, wherein determining comprises:
  accessing a profile of the source user, a profile of the target user, and a plurality of profiles corresponding to a plurality of contacts of at least one of the source user and the target user from each of the one or more communication platforms;
  correlating the profile of the source user, the profile of the target user, and the plurality of profiles corresponding to the plurality of contacts.

5. The method of claim 4, wherein the profile comprises at least one of a name, a username, a contact number, a contact address, a contact email, a location, a demographic information, a relationship status, or an interest.

6. The method of claim 4, further comprising compiling and indexing the plurality of profiles corresponding to the plurality of contacts from each of the one or more communication platforms in a single database.

7. The method of claim 1, wherein the one or more proximity parameters comprise at least one of a time zone, a relationship status, a communication history, a communication type, a tracking history, a location history, or a presence in an event.

8. The method of claim 1, wherein generating the initial set comprises applying a predetermined primary scoring threshold.

9. The method of claim 1, wherein presenting comprises presenting a mini-profile for each of the initial set of correlative contacts, the mini-profile comprising at least one of a name, a location, a time-zone, and a score.

10. The method of claim 1, wherein the plurality of selectable communication recourses comprises at least one of a phone call, a video call, a text message, an instant message, a voice mail, a post, or an email.

11. The method of claim 1, further comprising suggesting at least one preferred communication recourse from the plurality of selectable communication recourses for each of the initial set of correlative contacts, wherein suggesting the at least one preferred communication recourse is based on at least one of a preference of a corresponding correlative contact, a location of the corresponding correlative contact, a time zone of the corresponding correlative contact, a relationship status between the source user and the corresponding correlative contact, and a communication history between the source user and the corresponding correlative contact.

12. The method of claim 1, wherein providing the plurality of selectable recourses to reach out to the target user comprises:
  extracting data from the communication with the at least one of the initial set of correlative contacts; and
  determining the plurality of selectable recourses to reach out to the target user based on the data.

13. The method of claim 1, further comprising:
  determining a need to generate a subsequent set of correlative contacts from the plurality of correlative contacts based on at least one of a satisfaction level of the source user and the communication with the at least one of the initial set of correlative contacts;
  in response to the need, generating the subsequent set of correlative contacts by:
    assigning a secondary weight to each of the one or more proximity parameters using a machine learning algorithm;
    computing a weighted average of the one or more proximity parameters for each of the plurality of correlative contacts; and
    applying a predetermined secondary scoring threshold;
  presenting the subsequent set of correlative contacts along with a plurality of selectable communication recourses for each of the subsequent set of correlative contacts; and
  initiating a communication with at least one of the subsequent set of correlative contacts upon selection of a corresponding communication recourse from the plurality of selectable communication recourses.

14. The method of claim 13, wherein generating the subsequent set of correlative contacts comprises generating the subsequent set of correlative contacts from the initial set of correlative contacts.

15. A system for managing an unsuccessful communication session initiated by a source user to a target user, the system comprising:
  at least one processor; and
  a computer-readable medium storing instructions that, when executed by the at least one processor, cause the at least one processor to perform operations comprising:
    determining a plurality of correlative contacts between the source user and the target user from one or more communication platforms connecting the source user and the target user;
    scoring the plurality of correlative contacts based on one or more proximity parameters among the source user, each of the plurality of correlative contacts, and the target user, wherein the scoring comprises:
      assigning a primary weight to each of the one or more proximity parameters using a machine learning algorithm, and computing a weighted average of the one or more proximity parameters for each of the plurality of correlative contacts;

generating an initial set of correlative contacts from the plurality of correlative contacts based on the scoring, wherein generating the initial set comprises applying a predetermined primary scoring threshold;

presenting the initial set of correlative contacts along with a plurality of selectable communication recourses for each of the initial set of correlative contacts;

initiating a communication with at least one of the initial set of correlative contacts upon selection of a corresponding communication recourse from the plurality of selectable communication recourses; and providing a plurality of selectable recourses to reach out to the target user based on the communication with the at least one of the initial set of correlative contacts.

16. The system of claim 15, wherein determining comprises:

accessing a profile of the source user, a profile of the target user, and a plurality of profiles corresponding to a plurality of contacts of at least one of the source user and the target user from each of the one or more communication platforms;

correlating the profile of the source user, the profile of the target user, and the plurality of profiles corresponding to the plurality of contacts.

17. The system of claim 15, wherein the operations further comprise:

determining a need to generate a subsequent set of correlative contacts from the plurality of correlative contacts based on at least one of a satisfaction level of the source user and the communication with the at least one of the initial set of correlative contacts;

in response to the need, generating the subsequent set of correlative contacts by:

assigning a secondary weight to each of the one or more proximity parameters using a machine learning algorithm;

computing a weighted average of the one or more proximity parameters for each of the plurality of correlative contacts; and applying a predetermined secondary scoring threshold;

presenting the subsequent set of correlative contacts along with a plurality of selectable communication recourses for each of the subsequent set of correlative contacts; and initiating a communication with at least one of the subsequent set of correlative contacts upon selection of a corresponding communication recourse from the plurality of selectable communication recourses.

18. A non-transitory computer-readable medium storing computer-executable instructions for:

determining a plurality of correlative contacts between a source user and a target user from one or more communication platforms connecting the source user and the target user;

scoring the plurality of correlative contacts based on one or more proximity parameters among the source user, each of the plurality of correlative contacts, and the target user, wherein the scoring comprises:

assigning a primary weight to each of the one or more proximity parameters using a machine learning algorithm, and computing a weighted average of the one or more proximity parameters for each of the plurality of correlative contacts;

generating an initial set of correlative contacts from the plurality of correlative contacts based on the scoring;

presenting the initial set of correlative contacts along with a plurality of selectable communication recourses for each of the initial set of correlative contacts;

initiating a communication with at least one of the initial set of correlative contacts upon selection of a corresponding communication recourse from the plurality of selectable communication recourses; and providing a plurality of selectable recourses to reach out to the target user based on the communication with the at least one of the initial set of correlative contacts.

* * * * *